United States Patent
Fort et al.

(10) Patent No.: US 10,732,114 B2
(45) Date of Patent: Aug. 4, 2020

(54) SYSTEM AND METHOD FOR MEASURING A PHYSICAL PARAMETER OF A MEDIUM

(71) Applicants: CENTRE NATIONAL DE LA RECHERCHE SCIENTIFIQUE—CNRS—, Paris (FR); Ecole Supérieure de Physique et de Chimie Industrielles de la Ville de Paris, Paris (FR)

(72) Inventors: Emmanuel Fort, Cachan (FR); Sandrine Leveque-Fort, Cachan (FR); Nicolas Bourg, Ivry sur Seine (FR)

(73) Assignees: CENTRE NATIONAL DE LA RECHERCHE SCIENTIFIQUE, Paris (FR); ECOLE SUPÉRIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 9 days.

(21) Appl. No.: 16/320,078

(22) PCT Filed: Jul. 11, 2017

(86) PCT No.: PCT/FR2017/051901
§ 371 (c)(1),
(2) Date: Jan. 23, 2019

(87) PCT Pub. No.: WO2018/020098
PCT Pub. Date: Feb. 1, 2018

(65) Prior Publication Data
US 2019/0271649 A1 Sep. 5, 2019

(30) Foreign Application Priority Data
Jul. 25, 2016 (FR) ..................... 16 57130

(51) Int. Cl.
*G01N 21/64* (2006.01)
*G02B 21/16* (2006.01)
(Continued)

(52) U.S. Cl.
CPC ..... *G01N 21/6458* (2013.01); *G01N 21/6428* (2013.01); *G01N 21/6445* (2013.01);
(Continued)

(58) Field of Classification Search
CPC .......... G01N 21/6458; G01N 21/6428; G01N 21/6445; G01N 2021/6439;
(Continued)

(56) References Cited

U.S. PATENT DOCUMENTS 5,457,536 A 10/1995 Kornfield et al.
2014/0367590 A1 12/2014 Walla

FOREIGN PATENT DOCUMENTS

KR 2013-0115891 A 10/2013

OTHER PUBLICATIONS

Hafi, et al., "Fluorescence nanoscopy by polarization modulation and polarization angle narrowing", Nature Methods, vol. 11, No. 5, pp. 579-584, Jan. 1, 2015.

*Primary Examiner* — Courtney D Thomas
(74) *Attorney, Agent, or Firm* — Baker & Hostetler LLP

(57) ABSTRACT

Method and system for measuring a physical parameter of a target region of a medium are provided, wherein: an excitation wave having a periodic modulation over time of a physical characteristic is emitted, a return wave is periodically deflected with a controllable deflecting element so that the deflected wave scans a transducer array, each transducer being associated with a predefined phase range of the periodic modulation, a phase image is recorded during at least one period of the periodic modulation, a phase shift between a periodic modulation of the return wave and the (Continued)

periodic modulation of the excitation wave is determined from the phase image, a physical parameter of the target region is determined from the phase shift.

11 Claims, 2 Drawing Sheets

(51) Int. Cl.
    *G02B 21/14*     (2006.01)
    *G02B 21/00*     (2006.01)

(52) U.S. Cl.
    CPC ......... *G02B 21/0068* (2013.01); *G02B 21/14* (2013.01); *G02B 21/16* (2013.01); *G01N 2021/6439* (2013.01); *G01N 2021/6463* (2013.01); *G02B 21/0076* (2013.01)

(58) Field of Classification Search
    CPC ........ G01N 2021/6463; G02B 21/0068; G02B 21/14; G02B 21/16; G02B 1/0076
    See application file for complete search history.

SYSTEM AND METHOD FOR MEASURING A PHYSICAL PARAMETER OF A MEDIUM

CROSS-REFERENCE TO RELATED APPLICATIONS

This application is a National Stage of International patent application PCT/FR2017/051901, filed on Jul. 11, 2017, which claims priority to foreign French patent application No. FR 1657130, filed on Jul. 25, 2016, the disclosures of which are incorporated by reference in their entirety.

FIELD OF THE INVENTION

The present invention relates to systems and methods for measuring physical parameters in a medium.

The invention may in particular be applied to the field of super-resolution optical microscopy and imaging.

Other fields of application may be envisioned, in particular the field of acoustics and of radiofrequency waves for example.

BACKGROUND

One super-resolution optical microscopy technique, called super-resolution fluorescence optical microscopy, consists in measuring the position and the physical characteristics of fluorophores incorporated into the observed medium.

The fluorophores are excitable nanoscopic light emitters that, when they are excited by incident light, emit a certain number of photons before self-destructing. The objective of super-resolution optical methods is to capture these photons so as to locate and/or characterize the fluorophores before the latter self-destruct.

For example, the PALM (acronym of Photo-Activation Localization Microscopy) and STORM (acronym of Stochastic Optical Reconstruction Microscopy) methods are known super-localization microscopy techniques.

One common point of these techniques is that a small number of fluorophores are activated in the medium so as to be able to greatly zoom in onto a single fluorophore and to determine the center of the focal spot generated by said fluorophore.

These observation techniques thus allow intracellular structures to be observed with a precision of about ten nanometers.

These techniques however have drawbacks.

Thus the precision of the position obtained by measuring the center of the focal spot is limited and dependent on the square root of the number of photons received from the fluorophore. Moreover, the emission originating from a rotationally immobile dipolar emitter, such as certain fluorophores, is anisotropic and dependent on the polarization of the exciting light. This creates uncertainty in the obtained position of the fluorophore. Moreover, the need to zoom in onto the fluorophore in order to view the focal spot substantially limits the size of the field of observation.

SUMMARY OF THE INVENTION

The aim of the present invention is to improve this situation. The present invention is particularly advantageous in the case of a medium that emits a limited number of photons, in particular in a very short time, for example in the case of so-called "single" emitters, i.e. emitters with a limited lifetime that are sufficiently spaced apart from one another to be able to be distinguished from one another optically. Specifically, the present invention allows a substantial portion of the photons emitted by the medium to be collected and thus precise information on the physical characteristics of the medium to be obtained. The present invention is not however limited to the field of application of super-resolution optical microscopy but may be applied to many other fields such as the field of acoustics or of radiofrequency waves for example.

To this end, a first subject of the invention is a method for measuring a physical parameter of a target region of a medium:

an excitation wave is emitted into at least one target region of a medium, such that said wave has, in the location of said target region, a periodic modulation over time of at least one physical characteristic with a predefined temporal period, a return wave, emitted in response to the excitation wave, is received from said target region, said return wave is periodically deflected into a deflected wave by means of a controllable deflecting element, so that said deflected wave scans a transducer array in each period of the periodic modulation, each transducer of the transducer array being associated with a predefined phase range of said periodic modulation, a phase image comprising signals generated by each transducer of the transducer array, in response to the deflected wave, is recorded during at least one period of the periodic modulation, a phase shift between a periodic modulation over time of at least one physical characteristic of the return wave and the periodic modulation over time of at least one physical characteristic of the excitation wave is determined from said phase image, a physical parameter of said target region is determined from said phase shift.

In preferred embodiments of the invention, recourse may optionally furthermore be made to one and/or more of the following dispositions:

the waves are electromagnetic waves, in particular light waves;
the transducers are photodetectors, in particular a camera;
the periodic modulation over time of at least one physical characteristic is a periodic modulation over time of the polarization of the excitation wave and the physical parameter of said target region is information on the orientation of a light emitter present in said target region, in particular a fluorophore;
the periodic modulation over time of at least one physical characteristic is a periodic modulation over time of the amplitude of the excitation wave and the physical parameter of said target region is information on the lifetime or information on the position of a light emitter present in said target region, in particular a fluorophore;
for the emission of the excitation wave, a wave that is spatially modulated in the medium is generated and said wave that is spatially modulated in the medium is moved, in particular with a constant predefined velocity,
in particular an electromagnetic wave that is spatially modulated in the medium is generated by generating an interference pattern between two laser beams in the medium;
said excitation wave is emitted such that said wave has, in the location of said target region, a plurality of periodic modulations over time of at least one physical characteristic, with a plurality of predefined temporal periods associated with each periodic modulation of said plurality of periodic modulations, respectively, the return wave is periodically deflected into a deflected wave so that each transducer of the transducer array is associated with a predefined phase range of each periodic modulation of said plurality of periodic modulations, a plurality of phase shifts of the medium is determined, each phase shift of the plurality of phase shifts being determined between a periodic modulation over time of at least one physical characteristic of the return wave and a periodic modulation over time of at least one respective physical characteristic of the excitation wave, respectively, and a plurality of physical parameters of said target region is determined from said plurality of phase shifts;

said plurality of physical parameters of said target region comprises at least information on the position and/or orientation and/or lifetime of a light emitter present in said target region, in particular a fluorophore.

Another subject of the invention is a system for measuring a physical parameter of a target region of a medium comprising:

an excitation-wave source able to emit an excitation wave into at least one target region of a medium, such that said wave has, in the location of said target region, a periodic modulation over time of at least one physical characteristic with a predefined temporal period, a transducer array, a controllable deflecting element that is able to periodically deflect, into a deflected wave, a return wave of said target region emitted in response to the excitation wave, so that said deflected wave scans the transducer array in each period of the periodic modulation, each transducer of the transducer array being associated with a predefined phase range of said periodic modulation, a processing module including:

a memory able to record a phase image comprising the signals generated by each transducer of the transducer array, in response to the deflected wave, during at least one period of the periodic modulation, a processor able to determine, from said phase image, a phase shift of the return wave output from said target region with respect to a phase of the periodic modulation of the excitation wave, and to determine a physical parameter of said target region from said phase shift.

In preferred embodiments of the invention, recourse may optionally furthermore be made to one and/or both of the following dispositions:

the controllable deflecting element is a rotatable mirror;

the controllable deflecting element is a fixed system comprising at least one polarization-controlling element, in particular an induced-birefringence optical element, in particular an induced-birefringence optical element the birefringence of which is induced via an electric field, a magnetic field or a mechanical stress.

Other features and advantages of the invention will become apparent from the following description of one of its embodiments, which is given by way of nonlimiting example with reference to the appended drawings.

In the various figures, the same references have been used to reference elements that are identical or similar.

DETAILED DESCRIPTION

Figure 1:
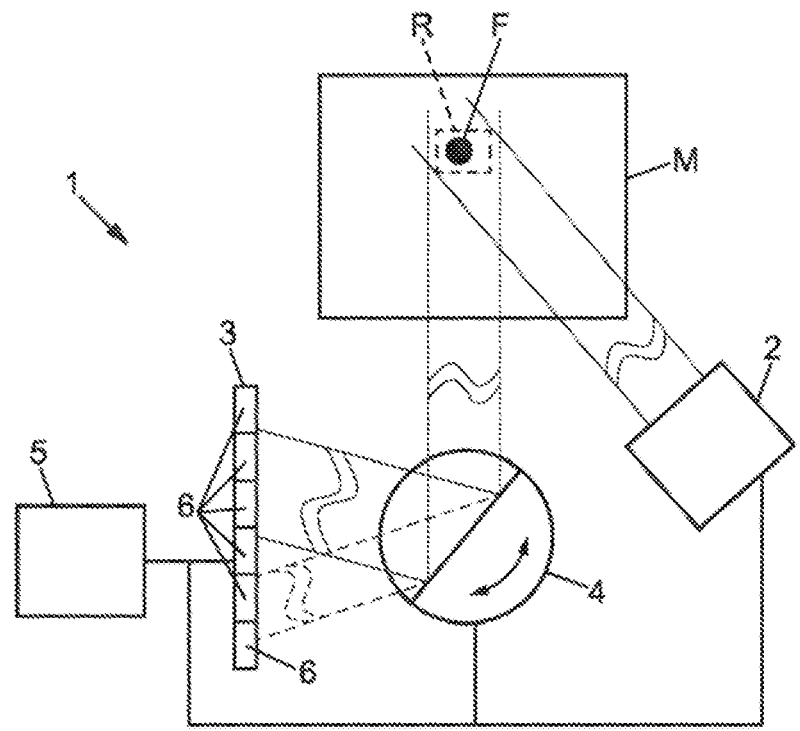
FIG. 1 is a schematic view of a system for measuring a physical parameter of a target region of a medium according to one embodiment of the invention.

FIG. 1 illustrates a system 1 for measuring a physical parameter of a target region of a medium according to one embodiment of the invention.

According to embodiments of the invention, the waves mentioned in the present description will possibly be optical, acoustic or electromagnetic waves.

The optical waves are for example waves belonging to the domains of the visible, of the infrared and/or of the ultraviolet.

The electromagnetic waves are for example terahertz or radio-frequency waves, for example having a central frequency comprised between a few megahertz and a few terahertz.

The acoustic waves may for example be ultrasonic waves, for example waves having a central frequency possibly comprised between 200 kHz and 100 MHz and for example between 0.5 MHz and 10 MHz.

All the elements of the device 1 are adapted and chosen by the skilled person depending on the type and frequency of the waves in question.

Thus, for example, the emitting and receiving elements, the transmission windows, the reflective cavity and other reflective elements, the scattering medium and the diffusers, the lenses and the focusing elements and any other element employed in the pulse-focusing device 1 and the focusing method are respectively adapted to the type and to the frequency of the waves and/or pulses chosen by the skilled person.

The system 1 shown in FIG. 1 comprises an excitation-wave source 2, a transducer array 3, a controllable deflecting element 4 and a processing module 5.

The processing module 5 for example includes a processor and a memory and is able to control the source 2, the transducer array 3 and the controllable deflecting element 4.

The system 1 is for example intended for example to carry out super-resolution optical imaging of a fluorophore F present in a target region R of a medium M.

By "super-resolution optical imaging", what is for example meant is that the system 1 is able to determine information on the position of the fluorophore F in the target region R with a resolution higher than the diffraction limit.

By "information on the position of the fluorophore in the target region", what is for example meant is information on the relative position of the fluorophore in at least one spatial direction, for example a quantity $\Delta x$ indicating a relative position of the fluorophore with respect to a reference position in a spatial direction X.

The excitation-wave source 2 is able to emit an excitation wave into the target region R.

The source 2 is in particular able to emit said excitation wave such that said wave has, in the location of the target region R, a periodic modulation over time of at least one physical characteristic with a predefined temporal period.

In one embodiment of the invention, the waves, and in particular the excitation wave, are thus electromagnetic waves and in particular light waves. The excitation wave is for example a coherent wave output by at least one laser.

The target region R may be of variable dimensions. In one embodiment of the invention, the target region R may for example have dimensions close to those of one fluorophore. In other embodiments of the invention, the target region R may cover a larger field.

By "said wave has, in the location of the target region, a periodic modulation over time of at least one physical characteristic", what is meant is that, at each point P of the target region R, said physical characteristic of the excitation wave is periodically modulated over time. The modulations of the physical characteristic of the excitation wave at each point P of the target region R may be in phase or be phase shifted so that for example the exciting wave also has a spatial periodicity.

Thus, in one embodiment of the invention, for the emission of the excitation wave, the source 2 may for example generate a wave that is spatially modulated in the medium and move said wave that is spatially modulated in the medium with a predefined velocity, for example a constant predefined velocity.

The predefined temporal period may then be determined from the velocity of movement and from the spatial period of the spatially modulated electromagnetic wave.

In one example of this embodiment, the source 2 may for example generate an electromagnetic wave that is spatially modulated in the medium by generating an interference pattern between two laser beams in the medium.

In this example embodiment, the periodic modulation over time of at least one physical characteristic is then a periodic modulation over time of the amplitude of the excitation wave.

In another embodiment, the periodic modulation over time of at least one physical characteristic may be a periodic modulation over time of the polarization of the excitation wave. To this end, the source 2 may for example include a rotatable polarizer that pivots with a rotation frequency corresponding to said predefined temporal period.

The source 2 may thus for example include one or more lasers and, where appropriate, controllable optical components and/or actuators that allow the excitation wave to be formed and the periodic modulation of the excitation wave to be controlled. The optical components may in particular comprise means for generating an interference pattern from two laser beams, such as lenses and/or mirrors in particular. The actuators may in particular comprise means for moving such an interference pattern in the medium with a predefined velocity, for example translationally and/or rotationally motorized lenses and/or mirrors or even deformable mirrors.

The transducer array 3 includes a plurality of transducers 6, which are for example aligned along an array axis or direction.

In variant embodiments, the transducer array 3 may be a two-dimensional matrix array of transducers 6.

In the embodiment in which the waves are light waves, the transducers 6 may for example be photodetectors. The transducer array 3 may for example take the form of a camera, in particular a CCD or CMOS camera.

Moreover, the system 1 includes a controllable deflecting element 4 that is able to periodically deflect, into a deflected wave, a return wave of the target region R, emitted in response to the excitation wave.

In a first embodiment illustrated in FIG. 1, the controllable deflecting element 4 is for example a rotatable mirror. A galvo mirror is an example of a rotatable mirror.

Figure 3:
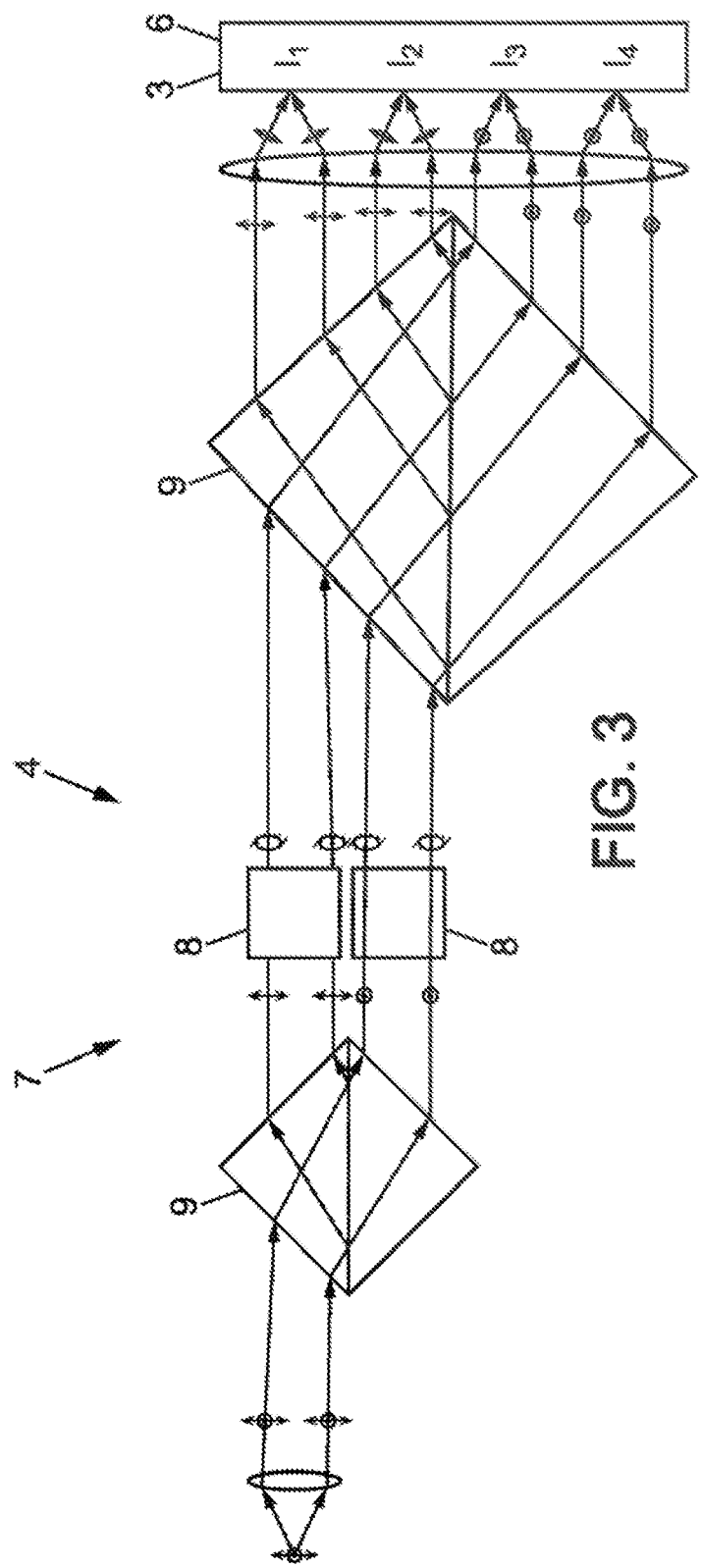
FIG. 3 is a schematic view of one variant embodiment of the system of FIG. 1.

In one variant embodiment illustrated in FIG. 3, the controllable deflecting element 4 is a fixed system 7.

By "the controllable deflecting element is a fixed system", what is meant is that the controllable deflecting element includes no moving parts.

In this way, it is possible to periodically deflect the return wave with frequencies that are even higher than in the case of a rotatable mirror, for example with periodic deflection frequencies reaching as high as several MHz.

In the example embodiment illustrated in FIG. 3, the fixed system 7 includes a polarization-controlling element 8 and elements 9 that split beams depending on their polarizations.

The polarization-controlling element 8 is an induced-birefringence optical element. In such an element, the birefringence may be controlled via an external action.

The polarization-controlling element 8 may be an induced-birefringence element, such as a Kerr or Pockels cell, the birefringence of which is induced via an electric field, an induced-birefringence element, such as a magneto-optical modulator, the birefringence of which is induced via a magnetic field using the Faraday effect, the Cotton-Mouton effect or the magneto-optic Kerr effect, or even an induced-birefringence element the birefringence of which is induced via a mechanical stress for example using a photo-elastic crystal.

Examples of elements 9 that split beams depending on their polarizations are illustrated in FIG. 3 and comprise two beam-splitter cubes. These cubes allow the return wave to be split into a plurality of polarized beams with a minimal loss of photons.

It will therefore be understood that a modulation of the polarization applied by the polarization-controlling element 8 allows the resultant beam to be deflected onto the transducers 6.

Generally, one of the advantages of the method and system according to the invention is to allow the collection, by the transducers, of almost all of the photons of the return wave of the target region R.

In this way, it is possible to observe single fluorophores in the target region R that have a very limited lifetime.

The various embodiments of the controllable deflecting element 4 that are detailed above allow a minimal loss of photons during the periodic deflection of the return wave into a deflected wave.

Figure 2:
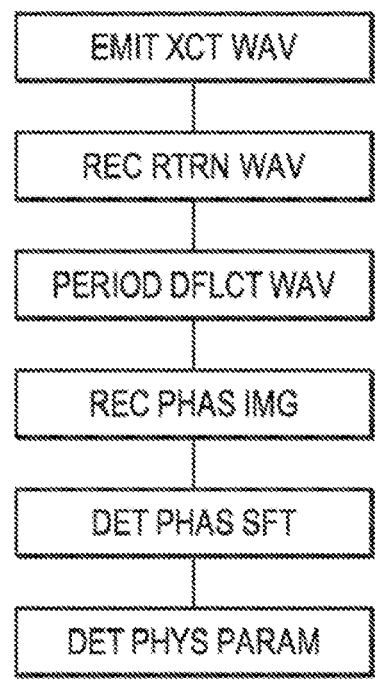
FIG. 2 is a flowchart illustrating one embodiment of a method for measuring a physical parameter of a target region of a medium according to one embodiment of the invention.

The operation of the system 1 will now be explained in more detail with reference moreover also to FIG. 2, which illustrates a method for measuring a physical parameter of a target region according to one embodiment of the invention.

In a first step of the method according to the invention, an excitation wave is thus emitted into at least one target region of a medium, such that said wave has, in the location of said target region, a periodic modulation over time of at least one physical characteristic with a predefined temporal period.

In response to the excitation wave, said target region R emits a return wave.

Advantageously, the return wave also has a periodic modulation over time of at least one physical characteristic with the same predefined temporal period. The periodic modulation of the return wave may however have a phase shift with respect to the periodic modulation of the exciting wave as will be detailed below.

Let for example the embodiment in which the target region includes a fluorophore and in which the physical characteristic of the periodically modulated exciting wave is the polarization of the excitation wave be considered. If the fluorophore behaves as an immobile dipolar emitter, it will emit a return wave the intensity of which will depend on the polarization of the received exciting wave and on the orientation of the fluorophore.

The return wave will therefore have a periodic modulation over time of its intensity, with the predefined temporal period. This periodic modulation will moreover have a phase shift with respect to the modulation of the polarization of the incident wave that will be dependent on the orientation of the fluorophore.

In this embodiment, if it is possible to measure the phase shift between the periodic modulation of the return wave and the periodic modulation of the exciting wave, it is then possible to determine information on the orientation of the light emitter present in the target region R, i.e. the fluorophore.

Let us now consider another embodiment in which the target region also includes a fluorophore but in which the physical characteristic of the periodically modulated exciting wave is the intensity of the excitation wave.

More particularly, let us consider the embodiment in which the excitation wave is a spatially modulated wave moved in the medium with a predefined velocity, a constant velocity for example.

Because of the periodic modulation of the intensity of the exciting wave in the location of the fluorophore F in the target region R, the fluorophore F emits a return wave the intensity of which is also modulated over time. The excitation wave moreover being modulated spatially, the phase shift between the periodic modulation of the return wave and the periodic modulation of the exciting wave will depend on the position of the fluorophore F in the target region R modulo the spatial periodicity of the excitation wave.

Thus, in this embodiment, if it is possible to measure the phase shift between the periodic modulation of the return wave and the periodic modulation of the exciting wave, it is then possible to determine information on the position of the light emitter present in the target region R, i.e. the fluorophore.

The method according to the invention thus includes steps allowing said phase shift to be determined with a high precision.

To this end, the controllable deflecting element 4 periodically deflects the return wave of the target region R, forming a deflected wave.

This periodic deflection is such that said deflected wave scans the transducer array 3 in each period of the periodic modulation, i.e. with the predefined temporal period applied to the excitation wave by the source 2.

Each transducer 6 of the transducer array 3 is thus associated with a predefined phase range of the periodic modulation of the exciting wave.

By way of nonlimiting example, let us consider an array of four transducers 6 that are juxtaposed with each other and scanned by the deflected wave in each period of the periodic modulation. The first transducer is then for example associated with a phase range extending from 0 degrees to 90 degrees of the periodic modulation; the second transducer is for example associated with a phase range extending from 90 degrees to 180 degrees of the periodic modulation; the third transducer is for example associated with a phase range extending from 180 degrees to 270 degrees of the periodic modulation; and the fourth transducer is for example associated with a phase range extending from 270 degrees to 360 degrees of the periodic modulation. The four transducers cover all of one period of the periodic modulation.

In particular, the deflected wave may integrally scan the transducer array 3 in each period of the periodic modulation, or only scan a subset of the array 3 as will in particular be detailed below.

It is then possible to record, during at least one period of the periodic modulation, a phase image comprising the signals generated by each transducer of the transducer array in response to the deflected wave. Said phase image may in particular be recorded in a memory of the processing module 5.

Advantageously, said phase image may be recorded during a plurality of periods of the periodic modulation, in particular if the predefined period is shorter than the integration time of the transducers.

In one embodiment, the transducers for example have an integration time of 50 milliseconds. The predefined period of the modulation may for example be shorter than 5 milliseconds. The phase image may then be recorded with an acquisition duration corresponding to at least about 10 periods of modulation of the exciting wave.

Thus, in one embodiment of the invention, the transducers have an integration time longer than the predefined temporal period, in particular longer than 5 times the predefined temporal period, and preferably longer than 10 times the predefined temporal period.

Since each transducer 6 of the transducer array 3 is associated with one predefined phase range of the periodic modulation of the exciting wave, it is thus possible to determine, from the phase image, a phase shift between the periodic modulation of the return wave and the periodic modulation of the excitation wave.

To give one example, it is possible to once more consider the nonlimiting example detailed above in which the array 3 includes four transducers 6 that are juxtaposed with each other and associated with phase ranges of the periodic modulation of 0 to 90 degrees, 90 to 180 degrees, 180 to 270 degrees and 270 to 360 degrees, respectively.

Let us also consider, by way of example, that a maximum signal measured by the four transducers is output by the first transducer, i.e. the transducer associated with the phase range from 0 to 90 degrees of the modulation of the exciting wave. If moreover the phase range of 0 to 90 degrees of the modulation of the exciting wave corresponds to a minimum of said modulation, it is then possible to determine that the modulation of the return wave is inverted with respect to the modulation of the exciting wave, i.e. that the phase shift between the periodic modulation of the return wave and the periodic modulation of the excitation wave is 180 degrees with a margin of error that depends on the width of the phase ranges associated with each transducer 6.

This example, which is given for four transducers 6, is very obviously generalizable to an arbitrary number of transducers: the narrower the phase ranges associated with each transducer, the higher the precision in the measurement of the phase shift, but the smaller the portion (number of photons for example) of the return wave received by each transducer. There is therefore an optimum between the signal-to-noise ratio of the signal output by the transducers and the precision with which the phase shift is determined.

One advantage of the invention is however to guarantee a measurement of the entirety of the return wave output by the medium (excluding losses related to the deflection by the deflecting element). Thus, in the case of a light wave, almost all of the photons output by the medium are received by the transducer array (reflection by the rotatable mirror generates losses). In the application to fluorophores, which emit a small number of photons before self-destruction, this allows the measurement of very weak signals to be guaranteed.

Lastly, in a last step of the method, it is then possible to determine a physical parameter of the target region R from said phase shift as was detailed above.

Thus for example in the embodiment in which the physical characteristic of the periodically modulated exciting wave is the polarization of the excitation wave, information on the orientation of the light emitter present in the target region R is determined as detailed above.

Also thus, in the embodiment in which the physical characteristic of the periodically modulated exciting wave is the intensity of the excitation wave and in which the excitation wave is a spatially modulated wave that is moved in the medium with a predefined velocity, information on the position of the light emitter present in the target region R is determined as detailed above.

In one variant embodiment, the excitation wave is emitted such that said wave has, in the location of said target region, a plurality of periodic modulations over time of at least one physical characteristic, with a plurality of predefined temporal periods associated with each periodic modulation of said plurality of periodic modulations, respectively.

In this embodiment, it is then advantageously possible to periodically deflect the return wave into a deflected wave so that each transducer of the transducer array is associated with a predefined phase range of each periodic modulation of said plurality of periodic modulations.

Once again, it is possible to record, over a duration extending over at least one period of each of the periodic modulations, a phase image comprising the signals generated by each transducer of the transducer array in response to the deflected wave.

A plurality of phase shifts of the medium is then determined, each phase shift of the plurality of phase shifts being determined relative to a phase of a respective periodic modulation of the plurality of periodic modulations, respectively.

Lastly, a plurality of physical parameters of said target region is determined from said plurality of phase shifts in a similar way to what was described above.

In this way, it is for example possible to determine, at the same time, information on the position of a light emitter in a plurality of spatial directions, for example X, Y, Z, or indeed, again at the same time, information on the position and information on the orientation of said light emitter.

Let us lastly consider one embodiment of the invention in which super-resolution optical microscopy is used to observe a field of observation including a plurality of fluorophores F.

In this embodiment, it is advantageously possible to combine super-resolution localization of the fluorophores with localization of normal resolution, so as to obtain information on the absolute position of the fluorophores as will now be described.

To this end, the method according to the invention may firstly be implemented so that the fluorophores excited simultaneously by the excitation wave are spaced apart from one another in the field of observation by a predefined minimum distance.

One embodiment allowing this to be achieved may consist in providing a medium including a sufficiently low density of fluorophores.

In another embodiment, the excitation wave may be generated such that it excites only one portion of the fluorophores present in the target region R, for example via a stochastic effect.

Methods allowing simultaneously excited fluorophores that are spaced apart from one another in the field of observation to be obtained are known, for example the aforementioned PALM and STORM methods.

Moreover, the transducer array 3 may be a two-dimensional matrix array of transducers 6 extending over a predefined length and a predefined width.

By "length" and "width", what is meant is the dimensions of the matrix array along a longitudinal axis X and a transverse axis Y that are perpendicular to each other, respectively.

The controllable deflecting element may be controlled so as to scan the transducer array along the transverse axis Y in each period of the periodic modulation.

In particular, the deflected wave may be moved over the transducer array, in each scan, by a scanning distance smaller than the width of the transducer array, in particular lower than one fifth of the width of the transducer array.

Said scanning distance may in particular be smaller than the predefined minimum distance separating the fluorophores that are simultaneously excited in the field of observation.

In this way, the focal spots formed by each fluorophore on the transducer array are separated from one another.

It is then possible to determine normally resolved position information from the general location of the focal spots formed by each fluorophore on the transducer array.

It is moreover possible to determine super-resolution position information, modulo the spatial periodicity of the excitation wave, by determining a phase difference as indicated above.

By combining the normally resolved position information and the super-resolution position information, it is possible to obtain information on the absolute position of the fluorophores in the field of observation with a precision higher than the diffraction limit.

The embodiment detailed above allows information on the absolute position of the fluorophores in the transverse direction to be obtained.

This embodiment may be extended to the case where the excitation wave includes a plurality of modulations, as detailed above. It is then possible to obtain information on the absolute position of the fluorophores in the transverse direction, the longitudinal direction and even, where appropriate, the thickness direction, perpendicular to the transverse and longitudinal directions, or indeed on the orientation of the fluorophores.

Generally, the various embodiments described above may be combined together.

The invention claimed is:

1. A method for measuring a physical parameter of a target region of a medium, wherein:
   an excitation wave is emitted into at least one target region of a medium, such that said wave has, in the location of said target region, a periodic modulation over time of at least one physical characteristic with a predefined temporal period,
   a return wave, emitted in response to the excitation wave, is received from said target region,
   said return wave is periodically deflected into a deflected wave by means of a controllable deflecting element, so that said deflected wave scans a transducer array in each period of the periodic modulation, each transducer of the transducer array being associated with a predefined phase range of said periodic modulation, a phase image comprising signals generated by each transducer of the transducer array, in response to the deflected wave, is recorded during at least one period of the periodic modulation, a phase shift between a periodic modulation over time of at least one physical characteristic of the return wave and the periodic modulation over time of at least one physical characteristic of the excitation wave is determined from said phase image, a physical parameter of said target region is determined from said phase shift.

2. The method as claimed in claim 1, wherein the waves are electromagnetic waves, in particular light waves.

3. The method as claimed in claim 2, wherein the transducers are photodetectors, in particular a camera.

4. The method as claimed in claim 1, wherein the periodic modulation over time of at least one physical characteristic is a periodic modulation over time of the polarization of the excitation wave and wherein the physical parameter of said target region is information on the orientation of a light emitter present in said target region, in particular a fluorophore.

5. The method as claimed in claim 1, wherein the periodic modulation over time of at least one physical characteristic is a periodic modulation over time of the amplitude of the excitation wave and wherein the physical parameter of said target region is information on the lifetime or information on the position of a light emitter present in said target region, in particular a fluorophore.

6. The method as claimed in claim 5, wherein, for the emission of the excitation wave, a wave that is spatially modulated in the medium is generated and said wave that is spatially modulated in the medium is moved, in particular with a constant predefined velocity, in particular wherein an electromagnetic wave that is spatially modulated in the medium is generated by generating an interference pattern between two laser beams in the medium.

7. The method as claimed in claim 1, wherein said excitation wave is emitted such that said wave has, in the location of said target region, a plurality of periodic modulations over time of at least one physical characteristic, with a plurality of predefined temporal periods associated with each periodic modulation of said plurality of periodic modulations, respectively, wherein the return wave is periodically deflected into a deflected wave so that each transducer of the transducer array is associated with a predefined phase range of each periodic modulation of said plurality of periodic modulations, wherein a plurality of phase shifts of the medium is determined, each phase shift of the plurality of phase shifts being determined between a periodic modulation over time of at least one physical characteristic of the return wave and a periodic modulation over time of at least one respective physical characteristic of the excitation wave, respectively, and wherein a plurality of physical parameters of said target region is determined from said plurality of phase shifts.

8. The method as claimed in claim 7, wherein said plurality of physical parameters of said target region comprises at least information on the position and/or orientation and/or lifetime of a light emitter present in said target region, in particular a fluorophore.

9. A system for measuring a physical parameter of a target region of a medium comprising:

an excitation-wave source able to emit an excitation wave into at least one target region of a medium, such that said wave has, in the location of said target region, a periodic modulation over time of at least one physical characteristic with a predefined temporal period, a transducer array, a controllable deflecting element that is able to periodically deflect, into a deflected wave, a return wave of said target region emitted in response to the excitation wave, so that said deflected wave scans the transducer array in each period of the periodic modulation, each transducer of the transducer array being associated with a predefined phase range of said periodic modulation, a processing module including:

a memory able to record a phase image comprising the signals generated by each transducer of the transducer array, in response to the deflected wave, during at least one period of the periodic modulation, a processor able to determine, from said phase image, a phase shift of the return wave output from said target region with respect to a phase of the periodic modulation of the excitation wave, and to determine a physical parameter of said target region from said phase shift.

10. The measuring system as claimed in claim 9, wherein the controllable deflecting element is a rotatable mirror.

11. The measuring system as claimed in claim 9, wherein the controllable deflecting element is a fixed system comprising at least one polarization-controlling element, in particular an induced-birefringence optical element, in particular an induced-birefringence optical element the birefringence of which is induced via an electric field, a magnetic field or a mechanical stress.

\* \* \* \* \*